United States Patent [19]
Hehl

[11] 3,982,856
[45] Sept. 28, 1976

[54] BASE AND POWER UNIT FOR INJECTION MOLDING MACHINE

[76] Inventor: Karl Hehl, Siedlung 183, 7291 Lassburg, Wurttemberg, Germany

[22] Filed: Apr. 14, 1975

[21] Appl. No.: 567,833

Related U.S. Application Data

[63] Continuation of Ser. No. 322,683, Jan. 11, 1973, abandoned.

[30] Foreign Application Priority Data

Jan. 11, 1972 Germany.......................... 2201078

[52] U.S. Cl.............................. 417/360; 222/385; 248/14; 417/363
[51] Int. Cl.².................... F04B 17/00; F16F 15/00
[58] Field of Search .......... 417/360, 361, 363, 313, 417/423 R, 424; 222/383, 385; 134/186, 188; 248/26, 27, 14; 259/102, 103

[56] References Cited
UNITED STATES PATENTS

| | | | |
|---|---|---|---|
| 2,017,302 | 10/1935 | Yoder............................ | 417/363 X |
| 2,059,872 | 11/1936 | Hull...................................... | 248/26 |
| 2,089,066 | 8/1937 | Morrill................................ | 417/363 |
| 2,261,915 | 11/1941 | Korte et al.......................... | 417/424 |
| 2,364,686 | 12/1944 | Balisteri............................ | 248/26 X |
| 2,422,022 | 6/1947 | Koertge ............................. | 134/188 X |
| 2,928,961 | 3/1960 | Morrill................................ | 248/26 |
| 2,954,791 | 10/1960 | Andrews........................... | 134/188 X |

FOREIGN PATENTS OR APPLICATIONS

| | | | |
|---|---|---|---|
| 1,062,349 | 4/1954 | France................................. | 417/424 |

*Primary Examiner*—C. J. Husar
*Assistant Examiner*—Leonard Smith
*Attorney, Agent, or Firm*—Joseph A. Geiger

[57] ABSTRACT

The machine base of an injection molding machine is constructed to form a hydraulic tank; the hydraulic power unit is mounted in a vertical wall of this tak so that the pump is positioned inside the tank while the electric motor remains outside. Mounting flanges clamp the power unit against the tank wall, with vibration-absorbing resilient compression members interposed between the flanges and the wall. The latter is reinforced around the opening by a supporting and centering profile in the area of flange overlap.

12 Claims, 5 Drawing Figures

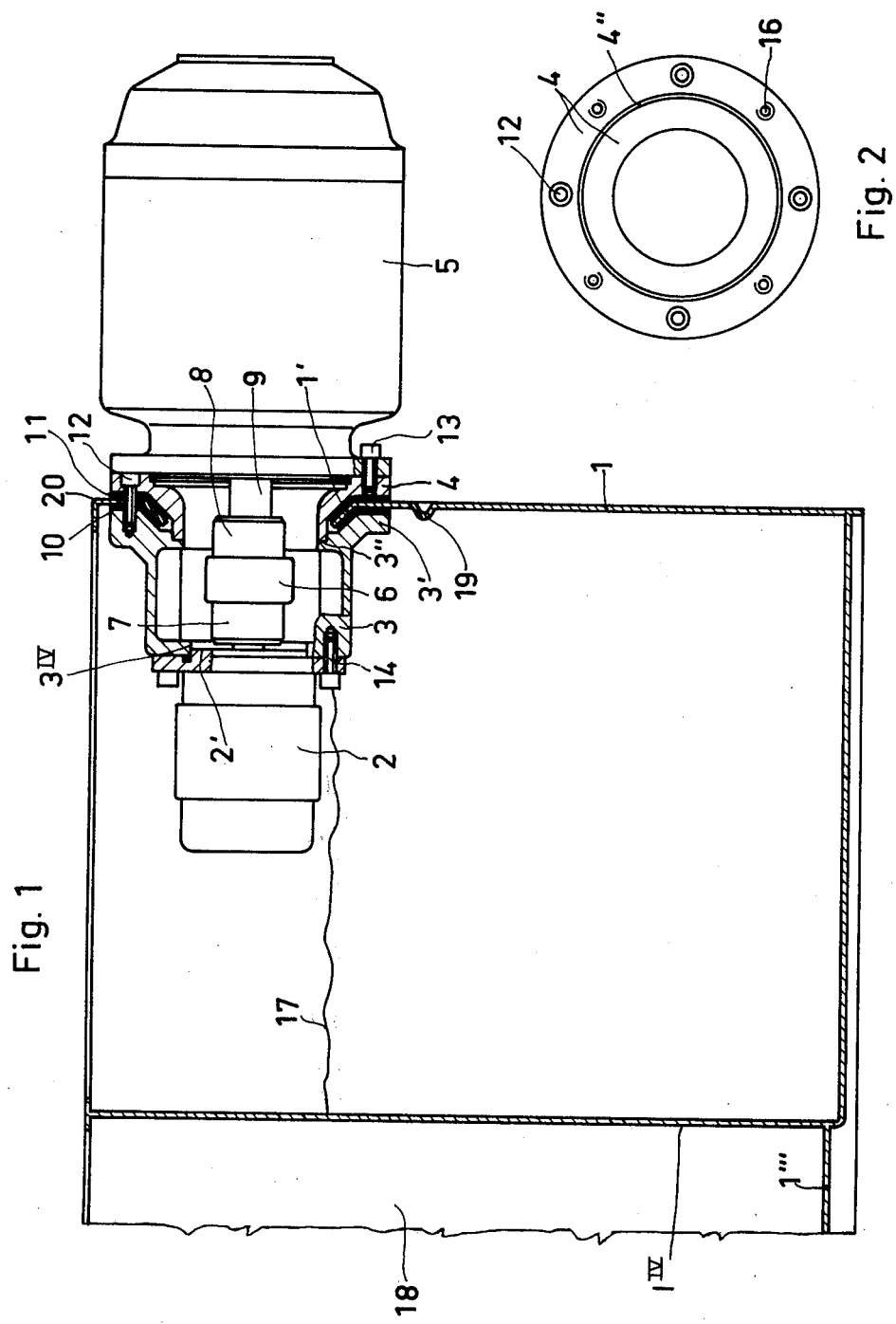

3,982,856

BASE AND POWER UNIT FOR INJECTION MOLDING MACHINE

CROSS REFERENCE TO RELATED APPLICATIONS

This application is a continuation of my co-pending application Ser. No. 322,683, filed on Jan. 11, 1973.

BACKGROUND OF THE INVENTION

1. Field of the Invention

The invention relates to injection molding machines, and in particular to the elastic mounting of hydraulic power units in the base of such injection molding machines.

2. Description of the Prior Art

Modern injection molding machines are as a rule operated by hydraulic devices, especially hydraulic cylinders which perform the opening and closing operations. The hydraulic power unit which supplies the pressurized fluid to these devices is advantageously mounted in the machine base itself is such a way that the reservoir for the hydraulic fluid is built into the machine base, or that the machine base is actually constructed in the form of a tank. It is known to arrange the hydraulic power unit, which consists of a pump and an electric motor, as a rigid unit mounted directly in an outside wall of the tank, i.e., in one of the walls of the machine base.

It was found that this particular prior art arrangement, while being compact in design, has the shortcoming of transmitting objectionable vibrations from the motor and pump into the base of the injection molding machine, thereby creating a bothersome operating noise.

SUMMARY OF THE INVENTION

It is an objective of the present invention to overcome the above-mentioned shortcomings by suggesting a noise abating arrangement of the power unit in the base of an injection molding machine.

The invention attains this objective by proposing a combined machine base and fluid tank in which the power unit is so arranged that the pump projects horizontally into the tank, while the drive motor which forms a rigid unit with the pump is located outside the tank, this rigid unit being elastically suspended in an outside wall of the tank by means of resilient supporting elements between the mounting flanges of the power unit.

As a result of extensive experimentation and testing, it was found that the machine base and power unit of the invention made it possible to reduce the operating noise to a very remarkable degree (i.e., a noise reduction of between 4 and 7 phone in one example), in comparison with prior art arrangements.

The invention further suggests that the tank wall in which the power unit is mounted is preferably so arranged that the mounting opening is surrounded by a wall area which is inclined relative to the plane of the mounting wall so as to form a centering and supporting means for the hydraulic power unit.

BRIEF DESCRIPTION OF THE DRAWINGS

Further special features and advantages of the invention will become apparent from the description following below, when taken together with the accompanying drawings which illustrate, by way of example, several embodiments of the invention represented in the various figures as follows:

FIG. 1 shows in an elevational cross section the rear portion of the base of an injection molding machine and a hydraulic power unit mounted on it in a first embodiment of the invention;

FIG. 2 is an end view of the connecting flange of the power unit of FIG. 1;

DESCRIPTION OF THE PREFERRED EMBODIMENTS

Figure 3:
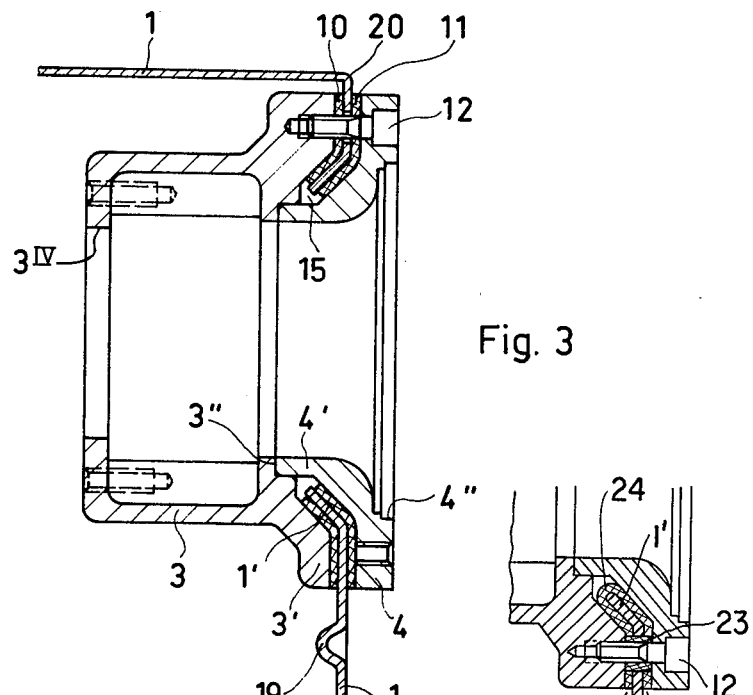
FIG. 3 shows in enlarged detail a cross section through the assembled mounting flanges of the power unit of FIG. 1.

In FIG. 1 is shown the rear portion of the base for an injection molding machine constructed in the form of a reservoir or tank for the hydraulic fluid which is part of the hydraulic drive system of the injection molding machine. This reservoir has a generally box-shaped outline delineated by an outer wall 1, which is also an outer wall of the machine base itself, and an inner wall $1^{IV}$, which latter divides the space inside the machine frame into two separate compartments. In the base compartment 18 to the left of wall $1^{IV}$, which is arranged underneath the die closing unit (not shown) of the injection molding machine, are arranged the various hydraulic controls and connecting lines as well as the electrical controls and a portion at least of the die closing unit, when the latter is mounted vertically on the machine base. Compartment 18 is closed on the bottom by a wall $1'''$. The tank compartment 21 between the walls 1 and $1^{IV}$ contains hydraulic fluid whose level is indicated by numeral 17. The outer tank wall 1 is also an outer wall of the machine base itself which is preferably fabricated from steel sheet. In the upper portion of wall 1 is mounted the hydraulic power unit of the injection molding machine. This hydraulic power unit is in the form of a compact rigid assembly consisting of a hydraulic pump 2 and an electric drive motor 5 coupled to the latter by a flexible coupling 6,7,8. The power unit extends horizontally through wall 1 in such a way that the pump 2 is located inside the tank and the motor 5 remains outside the tank compartment 21. In certain cases the power unit may consist of two co-axially arranged hydraulic pumps which are driven by a single electric motor. The pump 2 and the motor 5 are arranged as a compact rigid unit by means of co-axially interlocking mounting elements between the pump and the motor. These mounting elements consist of a hollow mounting socket 3 on the inside of wall 1 to which the pump 2 is attached and a mounting flange 4 outside of wall 1 to which the motor 5 is mounted. The mounting socket 3 and the mounting flange 4 in turn are centered relative to each other (see FIG. 3) by means of a centering collar which extends inwardly from mounting flange 4 into a matching centering recess $3''$ of mounting socket 3. This rigid power unit assembly extends horizontally through an opening in the end wall 1 into the upper space of the tank compartment 21. The mounting flange 4 and a matching flange portion $3'$ of the mounting socket 3 are arranged on opposite sides of wall 1 so as to clamp the latter in the area surrounding the wall opening. However, the flanges 4 and 3' do not directly contact wall 1. Between the wall and the flanges 4 and 3', respectively, are arranged resilient compression members so that the mounting flanges and the entire power unit can yield in relation to wall 1 under vibration. These resilient compression members are preferably in the form of flat annular discs 10 and 11 of a resilient material such as rubber. The interposition of the resilient annular discs 10 and 11 provides an elastic suspension for the rigid power unit in the wall 1 of the machine base so that the vibration and noise generated by the latter is largely absorbed by this novel suspension, instead of being transmitted to the walls of the machine base where it would tend to be intensified by resonance. The main axis of the power unit is preferably horizontal.

Figure 4:
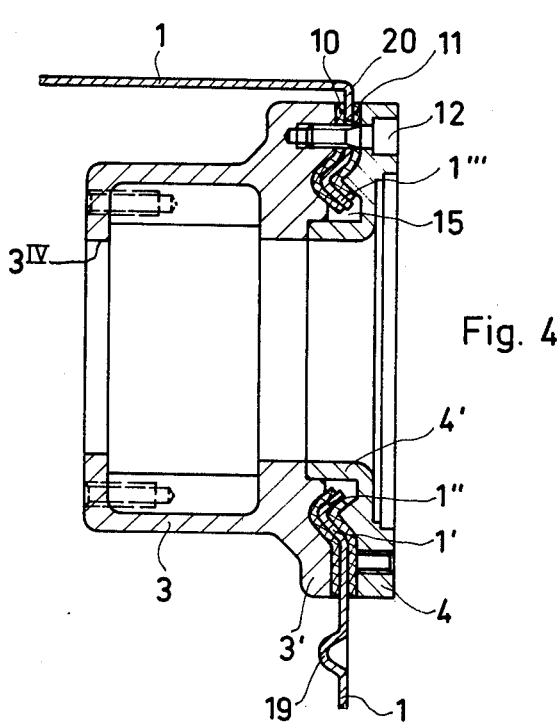

In FIGS. 3 and 4 are shown two embodiments of such an elastic suspension of the hydraulic power unit. In FIG. 3 the annular wall portion 1' around the opening in the outer wall 1 is depressed inwardly to form a cone-shaped mounting support for the power unit. This cone-shaped wall portion thus provides a centering means as well as a vertical support for the weight of the power unit. The outer diameter of the elastic annular discs 10 and 11 is preferably larger than the outer diameter of the cone-shaped wall portion 1' so that the flanges 4 and 3', which have the same outer diameter as the elastic annular discs 10 and 11, exert a clamping force not only against the cone-shaped portion, but also against the surrounding flat portion of wall 1 within the annular overlap area. The mounting flange 4 and flange portion 3' of socket 3 therefore require matching cone-shaped inner clamping faces which are surrounded by planar outer clamping faces. Between the edge of the wall opening, i.e., the inner edge of the cone-shaped wall portion 1', and the collar 4' of the mounting flange 4 is provided an annular free space 15 into which the material of the elastic annular discs 10 and 11 can partially escape when the latter are subjected to elastic compression. The cone-shaped wall portion 1' around the opening in wall 1, besides providing a convenient centering means for the power unit, has the additional advantage of stiffening the outer wall 1 so as to provide a better support for the hydraulic power unit which may be of considerable weight. It should be understood that the diameter of the several throughbores for the clamping screws 12 of the unit is large enough so that none of these screws 12 can come to bear against any of the throughbores under elastic deformation of the annular discs 10 and 11.

The clamping force between the motor mounting flange 4 and the flange portion 3' of the pump mounting socket 3 can be conveniently controlled by the degree of tightening of the clamping screws 12. The optimal clamping force for the greatest noise reduction is easily determined by way of trial and error under operational conditions. It depends primarily on the thickness and hardness (Shore-number) of the material used for the elastic annular discs 10 and 11 and on the type of vibration generated by the hydraulic power unit.

In the embodiments illustrated the maximum clamping displacement between mounting flange 4 and flange portion 3' is determined by the abutment of the centering collar 4' against the bottom of the centering recess 3". In this position the flanges form a rigid casing-like assembly. The clamping force can be increased by shortening the collar 4', or decreased by inserting a suitable shim between the end face of collar 4' and the bottom of recess 3".

The elastic suspension shown in FIG. 4 of the drawing differs from that shown in FIG. 3 primarily by the cross-sectional shape of the clamping assembly consisting of the wall portion 1' surrounding the opening in the outer wall 1, the two elastic annular discs 10 and 11, and the correspondingly profiled clamping faces of mounting flange 4 and flange portion 3' of socket 3.

As can be seen in FIG. 2, several calmping screws 12 are arranged in a regular angular spacing in the mounting flange 4, the clamping screws being countersunk Allen screws. The electric motor 5 itself has a matching flange portion by means of which it can be clamped onto the mounting flange 4, after the latter has been installed in wall 1 of the machine base. For this purpose, the mounting flange 4 further includes a number of threaded bores 16 which are angularly spaced between the clamping screws 12 and into which the screws 13 are threaded.

The hydraulic pump 2 is similarly mounted to the inner end face of mounting socket 3 by means of screws 14. For this purpose, the pump includes a flange portion with a centering collar 2' which engages a matching centering bore $3^{IV}$ in the end face of mounting socket 3. The mounting socket 3 in turn is co-axially centered with respect to the mounting flange 4, as mentioned further above, by means of a centering collar 4' which extends from the mounting flange 4 through the opening in wall 1 and engages the centering recess 3" in mounting socket 3. The coupling between the hydraulic pump 2 and the electric motor 5 consists of a rigid coupling half 7 mounted on the pump shaft, a similar rigid coupling half 8 mounted on the shaft 9 of the electric motor, and an elastic coupling member 6 which engages the two rigid coupling halves 7 and 8 independently. This elastic coupling assembly further contributes to the desired vibration dampening and noise abatement.

In the embodiment of FIG. 4 the wall portion surrounding the opening in wall 1 is shaped in the form of a bead 1". This wall profile considerably stiffens the wall 1 in the area of the opening and further provides better centering and alignment of the mounting flanges 4 and 3'. The outer wall 1 itself may be further stiffened by means of a transverse stiffening bead 19 below the opening for the power unit. This stiffening bead runs preferably parallel to the horizontal mounting face of the machine base.

It should by understood that, aside from the embodiments of the invention which are shown in the drawing, it would also be possible to create an elastic suspension without the specially formed surface portion 1' or 1" around the wall opening. This alternative (not shown in the drawing) is easier to manufacture, but requires additional precautions for the proper positioning of the mounting flange 4 and mounting socket 3 during assembly. In this case, the elastic rings interposed between the wall 1 and the two flanges can be identical flat rings. However, the throughbores for the clamping screws 12 are preferably provided with a still larger diameter than those of the previously described embodiments, in order to avoid metal-to-metal contact in the suspension. This arrangement may be adequate for a tank wall 1 which is sufficiently stiff without the reinforcing cone 1' or bead 1", and where the power unit is of moderate weight. In the case of a very heavy power unit which is to be mounted on a flat wall 1 it may be advantageous to provide an elastic sleeve 23 in each of the throughbores of wall 1 so that it surrounds the clamping screw 12. These elastic sleeves would prevent any gradual downward sliding of the power unit to a position where the clamping screws 12 would rest against the edges of the throughbores.

Figure 5:
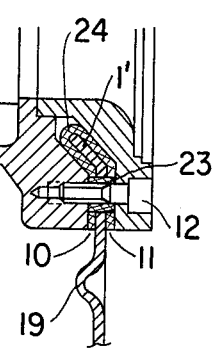
FIG. 4 shows in a similar enlarged cross section a second embodiment of the invention featuring a modified arrangement of the mounting flanges for the power unit and FIG. 5 shows a portion of a cross section similar to FIG. 3, with a modified elastic disc configuration.

Another simple modification which is shown in FIG. 5 involves the fabrication of the two elastic annular discs 10 and 11 in the form of a single molded U-shaped profile which includes, at the smaller diameter of the two annular discs 10 and 11, a connecting portion 24 positioned inside the edge of the wall opening in the annular free space 15. In this case, it may be necessary, for easier insertion of the elastic compression member into the wall opening, to provide the compression member in the form of a number of ring sectors which can be successively snapped over the wall portion 1' or 1", respectively, at assembly.

It should be understood, of course, that the foregoing disclosure describes only preferred embodiments of the invention and that it is intended to cover all changes and modifications of these examples of the invention which fall within the scope of the appended claims.

What is claimed is:

1. A device for elastically mounting a power unit in a machine base, the power unit being a hydraulic pump and a coaxially coupled electric motor, or a similar vibration-generating unit, and the machine base being, for example, the base of an injection molding machine, the device comprising in combination:
   a generally flat wall which forms a part of the machine base and extends substantially perpendicularly to the rotational center axis of the power unit, the wall having a center opening for the accommodation of the power unit in such a way that the power unit is positioned partially on one side of the wall and partially on the other side of the wall;
   a pair of cooperating mounting flanges defined by the power unit and arranged on opposite sides of the wall, the mounting flanges having oppositely facing planar clamping faces aligned in parallel with the wall and larger in size than said center opening, so as to define therewith bilateral areas of radial clamping overlap;
   two resiliently compressible discs interposed between the clamping faces of said power unit mounting flanges and the wall in said areas of radial clamping overlap;
   means for clamping said mounting flanges axially against one another, with the result of compressing the interposed resilient discs and creating a clamping engagement between the power unit flanges and the wall; and
   matching centering formations defined by the mounting flanges, by the wall, and by the interposed resilient discs, respectively, within said areas of clamping overlap, the centering formations taking the form of recesses in the mounting flanges, in the wall, and in the resilient discs, in one axial direction and of matching protrusions in said members in the other axial direction, thereby radially centering the power unit in relation to the wall in a position which is independent of the exact location of the center opening and of any other opening in said wall.

2. An elastic mounting device as defined in claim 1, wherein
   the wall of the machine base is a generally vertical wall, and the rotational axis of the power unit is oriented generally horizontally;
   the upper edge of said vertical wall terminates at a generally horizontal mounting face of the machine base, and the center opening of the wall is located near said upper edge; and
   the wall further includes a bead formation serving as a reinforcing profile, the latter being located below said center opening and extending parallel to said mounting face.

3. An elastic mounting device as defined in claim 1, wherein:
   said mounting flange clamping means includes a plurality of angularly spaced clamping fasteners extending axially through the mounting flanges and through the wall within said area of clamping overlap;
   the clamping fasteners are associated with means for limiting the maximum axial clamping compression applicable against said interposed resilient discs; and
   said wall further includes oversized throughbores for the clamping fasteners, so as to avoid contact between the latter and the wall, when the power unit is subjected to vibrations.

4. An elastic mounting device as defined in claim 3, wherein
   said mounting flange clamping means further includes a sleeve of resilient material surrounding each clamping fastener within the respective oversized throughbores.

5. An elastic mounting device as defined in claim 1, wherein
   the power unit mounting flanges define between them means for coaxially centering one mounting flange on the other, independently of the mounting flange clamping means.

6. An elastic mounting device as defined in claim 5, wherein:
   said mounting flange centering means includes a centering collar extending axially from one of the mounting flanges, so as to reach through the center opening of the wall into a matching centering recess defined by the other mounting flange; and
   an annular free space is provided between the outer diameter of said centering collar and the edge of said center opening, so as to avoid contact therebetween, when the power unit is subjected to vibrations.

7. An elastic mounting device as defined in claim 6, wherein:
   each power unit mounting flange is rigidly attached to that portion of the power unit which extends on the same side of the wall; the centering collar and cooperating centering recess of the mounting flanges define between them an axial abutment limiting the maximum axial clamping compression applicable against said interposed resilient discs; and
   the clamped mounted flanges thus provide a rigid connection between the portions of the power unit extending on opposite sides of the wall.

8. An elastic mounting device as defined in claim 7, wherein:
   the power unit includes an electric motor and a coaxially coupled hydraulic pump;

said wall is a confining wall for a hydraulic fluid reservoir, arranged within the machine base;

the electric motor is positioned on the outer side of said wall, and the hydraulic pump is positioned on the inside thereof;

one of the two power unit mounting flanges is an integral part of a hollow mounting socket extending inwardly from said wall, said socket including an inner end face spaced a dsitance from its clamping face, the hydraulic pump being bolted to that inner end face in a center coaxial relationship by means of a flange connection;

the other one of the mounting flanges includes a plurality of angularly spaced threaded bores for the accommodation of clamping bolts, the electric motor being clampable to said mounting flange, in a centered coaxial relationship, by means of said clamping bolts; and the power unit further includes a flexible shaft coupling between the coaxially extending drive shafts of said pump and electric motor.

9. an elastic mounting device as defined in claim 1, wherein:

the central wall opening is substantially concentric, and the areas of radial clamping overlap are generally annular with respect to the power unit axis;

the resilient discs are similarly annular and of generally uniform thickness; and the axial recesses and matching axial protrusions of the centering formations are likewise annular and concentric with respect to the power unit axis, their cross-sectional surface outlines being substantially parallel.

10. An elastic mounting device as defined in claim 9, wherein the annular resilient discs are linked to one another in a cross-sectionally U-shaped profile, with the linking portion of the U-shape extending through the center wall opening.

11. An elastic mounting device as defined in claim 9, wherein the axial recesses and matching axial protrusions of the centering formations include an annular, cone-shaped depression of the wall around its center opening of the wall; and matching depressions and protrusions, respectively, in the mounting flanges, on a radial portion of their clamping faces.

12. An elastic mounting device as defined in claim 9, wherein the axial recesses and matching axial protrusions of the centering formations include a bead-shaped deformation of the wall around its center opening, a matching annular groove in the clamping face of one flange, and a matching annular ridge in the clamping face of the other flange.

* * * * *